(12) United States Patent
Takehara et al.

(10) Patent No.: US 9,379,547 B2
(45) Date of Patent: Jun. 28, 2016

(54) APPLIANCE CONTROL SYSTEM

(75) Inventors: Kiyotaka Takehara, Nara (JP);
Yasuhiro Yanagi, Osaka (JP)

(73) Assignee: Panasonic Intellectual Property Management Co., Ltd., Tokyo (JP)

( * ) Notice: Subject to any disclaimer, the term of this patent is extended or adjusted under 35 U.S.C. 154(b) by 789 days.

(21) Appl. No.: 13/638,205

(22) PCT Filed: Apr. 1, 2011

(86) PCT No.: PCT/JP2011/058437
§ 371 (c)(1),
(2), (4) Date: Sep. 28, 2012

(87) PCT Pub. No.: WO2011/125941
PCT Pub. Date: Oct. 13, 2011

(65) Prior Publication Data
US 2013/0020871 A1    Jan. 24, 2013

(30) Foreign Application Priority Data
Apr. 2, 2010   (JP) .................................. 2010-086364

(51) Int. Cl.
*H02J 3/14*   (2006.01)
(52) U.S. Cl.
CPC ............. *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/414* (2015.04)
(58) Field of Classification Search
None
See application file for complete search history.

(56) References Cited

U.S. PATENT DOCUMENTS

| 5,414,640 A * | 5/1995 | Seem ........................... 700/291 |
| 2004/0098171 A1 | 5/2004 | Horst |

(Continued)

FOREIGN PATENT DOCUMENTS

| CN | 101558687 | 10/2009 |
| EP | 1758225 A2 | 2/2007 |

(Continued)

OTHER PUBLICATIONS

International Search Report for corresponding International Application No. PCT/JP2011/058437 mailed Jun. 14, 2011.

(Continued)

*Primary Examiner* — Rexford Barnie
*Assistant Examiner* — David Shiao
(74) *Attorney, Agent, or Firm* — Renner, Otto, Boisselle & Sklar LLP.

(57) ABSTRACT

The appliance control system includes electrical appliances and an appliance control device. The appliance control device includes a control unit configured to, upon receiving an energy conservation instruction indicative of a total reduction amount, send a control signal including common control order indicative of an individual reduction amount of the power consumption of the electrical appliance to at least one of the electrical appliances based on the total reduction amount. Each electrical appliance includes a functional unit having plural operation states with different power consumption, a control instruction storage unit storing plural control instructions for changing the operation state, an individual storage unit storing individual control information indicative of a correspondence relation between the individual reduction amount and the control instruction, and an operation control unit. Upon receiving the control signal, the operation control unit selects the control instruction associated with the individual reduction amount indicated by the common control order included in the received control signal with reference to the individual control information, and provides the selected control instruction to the functional unit. The functional unit performs an energy conservation control process of changing the operation state in accordance with the received control instruction.

14 Claims, 3 Drawing Sheets

(56) References Cited

U.S. PATENT DOCUMENTS

| | | |
|---|---|---|
| 2005/0192713 A1 | 9/2005 | Weik et al. |
| 2008/0088180 A1* | 4/2008 | Cash et al. ............... 307/31 |
| 2009/0240381 A1* | 9/2009 | Lane ...................... 700/296 |
| 2010/0131117 A1* | 5/2010 | Mattiocco et al. ......... 700/295 |
| 2010/0207728 A1* | 8/2010 | Roscoe et al. ............ 340/10.1 |

FOREIGN PATENT DOCUMENTS

| | | |
|---|---|---|
| JP | 10-094170 A | 4/1998 |
| JP | 2004-180411 A | 6/2004 |
| JP | 2006-332974 A | 12/2006 |
| JP | 2008-015748 A | 1/2008 |
| JP | 2008-099343 A | 4/2008 |
| JP | 2009-171823 A | 7/2009 |
| WO | WO 2008/051386 | 5/2008 |
| WO | WO 2009/029777 A1 | 3/2009 |

OTHER PUBLICATIONS

PCT/ISA/237 for corresponding International Application No. PCT/JP2011/058437 dated Jun. 14, 2011.

English translation of Office Action in corresponding Chinese Patent Application No. 201180018089.9 dated Jun. 25, 2014.

Extended European Search Report for corresponding European Patent Application 11765841.9 dated Nov. 6, 2014.

\* cited by examiner

APPLIANCE CONTROL SYSTEM

TECHNICAL FIELD

The present invention relates to an appliance control system which can reduce power consumption of electrical appliances (control-target appliances) to achieve energy conservation.

BACKGROUND ART

With the increased concern for energy conservation in recent years, general consumer's awareness of energy conservation has been raised. For example, general consumers prefer to buy electrical appliances with low power consumption. There has been proposed an appliance control system (cf., JP 2006-332974 A). The appliance control system performs centralized control of plural electrical appliances installed in a residence. The appliance control system reduces total power consumption of the electrical appliances in the residence. Hence, the appliance control system can conserve energy.

However, in such a residence, various types of electrical appliances such as a lighting fixture, an air conditioner, and a refrigerator are installed. Hence, to reduce power consumption, it is necessary to perform energy conservation processes respectively peculiar to electrical appliances. For example, a lighting fixture performs an energy conservation process of dimming control. An air conditioner performs an energy conservation process of increasing (or decreasing) a desired temperature.

Thus, to reduce total power consumption of plural electrical appliances, a user is required to know, for each electrical appliance, how much power consumption is reduced by performing what kind of energy conservation process. For example, to reduce the total power consumption of all of the electrical appliances by 200 W, a user should select one or more from the electrical appliances and also select one or more from the energy conservation control processes such that the reduction of 200 W is achieved. The user should also transmit instructions indicative of the peculiar energy conservation control processes to the respective electrical appliances. Consequently, the user is required to perform such a troublesome procedure.

SUMMARY OF INVENTION

In view of the above insufficiency, the present invention has aimed to propose an appliance control system capable of reducing the total power consumption of electrical appliances without providing individual instructions of energy conservation control processes for the respective electrical appliances.

The first aspect of the appliance control system in accordance with the present invention includes plural electrical appliances configured to operate with electrical power supplied from an external power source, and an appliance control device connected to the plural electrical appliances. The appliance control device comprises an external interface unit, and a control unit. The external interface unit is configured to receive an energy conservation instruction indicative of a total reduction amount of power consumption of the plural electrical appliances from the external device. The control unit is configured to, upon acknowledging that the external interface unit receives the energy conservation instruction, send a control signal including a common control order indicative of an individual reduction amount of the power consumption of the electrical appliance to at least one of the plural electrical appliances based on the total reduction amount indicated by the energy conservation instruction. The electrical appliance includes a functional unit, a control instruction storage unit, an individual storage unit, and an operation control unit. The functional unit has plural operation states with different power consumption. The control instruction storage unit configured to store plural control instructions for changing the operation state of the functional unit. The individual storage unit is configured to store individual control information indicative of a correspondence relation between the individual reduction amount and the control instruction. The operation control unit is configured to, upon receiving the control signal, refer to the individual control information stored in the individual storage unit, and select, from the plural control instructions stored in the control instruction storage unit, the control instruction corresponding to the individual reduction amount indicated by the common control order included in the received control signal, and provide the selected control instruction to the functional unit. The functional unit is configured to, upon receiving the control instruction from the operation control unit, perform an energy conservation control process of changing its operation state in accordance with the received control instruction.

In the second aspect of the appliance control system in accordance with the present invention, in addition to the first aspect, the electrical appliance further includes a state identifying unit configured to identify a current operation state of the functional unit. The individual storage unit is configured to store the individual control information for each operation state of the functional unit. The operation control unit is configured to, upon receiving the control signal, refer to the individual control information stored in the individual storage unit associated with the current operation state identified by the state identifying unit, and select, from the plural control instructions stored in the control instruction storage unit, the control instruction corresponding to the individual reduction amount indicated by the common control order included in the received control signal, and provide the selected control instruction to the functional unit.

In the third aspect of the appliance control system in accordance with the present invention, in addition to the second aspect, each of the electrical appliances includes a reduction measurement unit and an information creation unit. The reduction measurement unit is configured to measure a difference in the power consumption of the functional unit between a previous operation state and the current operation state. The previous operation state is defined as the operation state of the functional unit before performance of the energy conservation control process in response to receipt of the control instruction by the functional unit, and the current operation state is defined as the operation state of the functional unit after the performance of the energy conservation control process by the functional unit. The information creation unit is configured to create the individual control information regarding the previous operation state by associating the control instruction provided to the functional unit with the difference of the power consumption measured by the reduction measurement unit as the individual reduction amount.

In the fourth aspect of the appliance control system in accordance with the present invention, in addition to any one of the first to third aspects, the appliance control system further includes a time period storage unit and a time period judging unit. The energy conservation instruction further includes an energy conservation time period indicative of a continuous time period of the energy conservation control process. The time period storage unit is configured to store an allowed continuous time period for which the functional unit of the electrical appliance is allowed to continue the energy conservation control process corresponding to the common control order. The time period judging unit is configured to, upon receiving the energy conservation instruction, refer to the time period storage unit, and retrieve the allowed continuous time period associated with the energy conservation control process which is performed by the functional unit in accordance with the power conservation instruction, and prohibit the functional unit from performing the energy conservation control process upon acknowledging that the allowed continuous time period is equal to or less than the energy conservation time period included in the energy conservation instruction.

In the fifth aspect of the appliance control system in accordance with the present invention, in addition to any one of the first to fourth aspects, the appliance control device further includes a capability storage unit configured to store, for each electrical appliance, an energy conservation capability indicative of a decreased amount of power consumption caused by the performance of the energy conservation control process by the functional unit. The control unit is configured to, upon acknowledging that the external interface unit receives the energy conservation instruction, refer to the capability storage unit, and select at least one combination of the electrical appliance and the energy conservation capability such that the energy conservation capability or the sum of the energy conservation capabilities is equal to or more than the total reduction amount indicated by the energy conservation instruction, and send the control signal including the common control order indicative of the individual reduction amount corresponding to the energy conservation capability to the selected electrical appliance.

In the sixth aspect of the appliance control system in accordance with the present invention, in addition to the fifth aspect, the capability storage unit is configured to store the energy conservation capabilities associated with the respective operation states of the functional unit. The appliance control device further includes a capability updating unit configured to, in response to the performance of the energy conservation control process by the functional unit of the electrical appliance, select the energy conservation capability associated with the current operation state of the functional unit as the energy conservation capability to be referenced by the control unit.

In the seventh aspect of the appliance control system in accordance with the present invention, in addition to the fifth or sixth aspect, the capability storage unit is configured to store appliance priority orders allocated to the respective electrical appliances based on a type of the electrical appliance. The control unit is configured to select the electrical appliance in conformity with the appliance priority orders stored in the capability storage unit in a process of selecting at least one combination of the electrical appliance and the energy conservation capability such that the energy conservation capability or the sum of the energy conservation capabilities is equal to or more than the total reduction amount indicated by the energy conservation instruction.

In the eighth aspect of the appliance control system in accordance with the present invention, in addition to any one of the fifth to seventh aspects, the capability storage unit is configured to store the energy conservation capabilities associated with the respective operation states of the functional unit, and energy conservation priority orders allocated to the respective energy conservation capabilities. The control unit is configured to select the energy conservation capability in conformity with the energy conservation priority orders stored in the capability storage unit in a process of selecting at least one combination of the electrical appliance and the energy conservation capability such that the energy conservation capability or the sum of the energy conservation capabilities is equal to or more than the total reduction amount indicated by the energy conservation instruction.

DESCRIPTION OF EMBODIMENTS

First Embodiment

Figure 1:
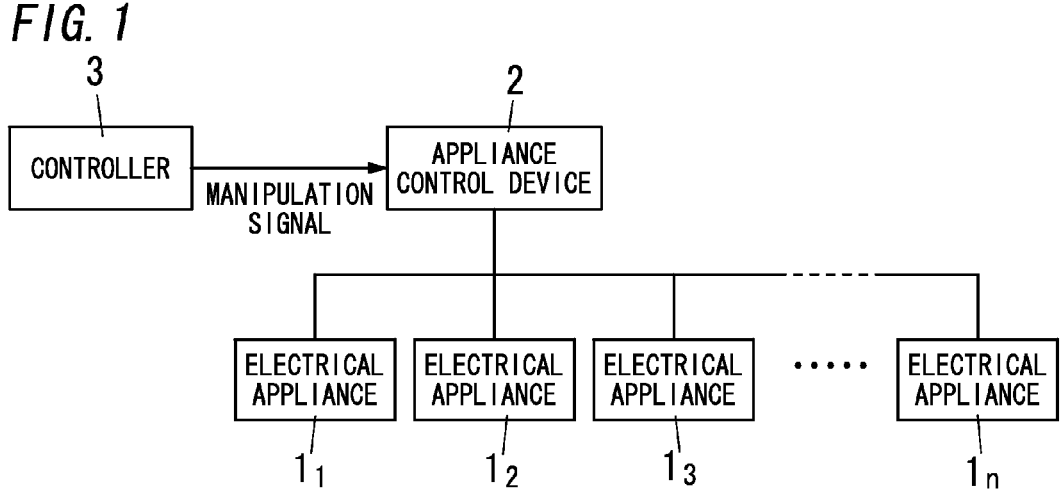
FIG. 1 is a schematic diagram illustrating the system configuration of the first embodiment.

As shown in FIG. 1, the appliance control system of the present embodiment includes plural electrical appliances (control-target appliances) $1_1, 1_2, \ldots, 1_n$ (the reference numeral "1" is used when there is no need to distinguish the respective appliances), an appliance control device 2 connected to the respective electrical appliances 1, and a controller 3 connected to the appliance control device 2. In the following explanation, it is assumed that each of the electrical appliances 1, the appliance control device 2, and the controller 3 is installed in a residence. For example, the electrical appliance 1 is a home appliance such as a lighting fixture, an air conditioner, a refrigerator, and a washing machine. As mentioned in the above, the appliance control system includes the plural electrical appliances 1 configured to operate with electrical power supplied from an external power source (e.g., a commercial power source, and a DC power source such as a solar cell and a fuel cell), and the appliance control device 2 connected to the plural electrical appliances 1. Besides, the appliance control device 2 may be connected to the electrical appliances 1 via a wired or wireless connection.

The controller 3 functions as a user interface, and is manipulated to control the electrical appliance 1. The controller 3 is configured to output a manipulation signal to the appliance control device 2 in accordance with manipulation. In the present embodiment, the controller 3 is a touch panel display, and is configured to allow a user to input at least a desired reduction amount of power consumption by manipulating keys displayed on a screen.

The appliance control device 2 is configured to, upon receiving the manipulation signal from the controller 3, output, to the electrical appliance 1, a control signal for controlling the electrical appliance in accordance with the contents of the manipulation signal. The appliance control device 2 is connected to the respective electrical appliances 1 via a home network (LAN). In the present embodiment, the appliance control device 2 and the controller 3 are provided as separate devices. Alternatively, the appliance control device 2 and the controller 3 may be provided as a single device. For example, the appliance control device 2 and the controller 3 may be provided as a single infrared remote control transmitter.

Figure 2:
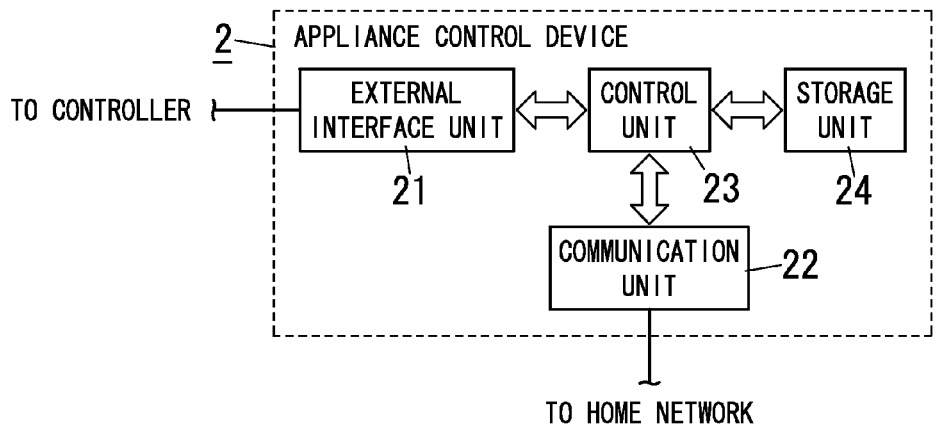
FIG. 2 is a schematic block diagram illustrating the configuration of the appliance control device of the above first embodiment.

As shown in FIG. 2, the appliance control device 2 includes an external interface unit 21, a communication unit 22, a control unit 23, and a storage unit 24. The external interface unit 21 is connected to the controller 3. The communication unit 22 is connected to the home network. The control unit 23 is connected to the external interface unit 21 and the communication unit 22.

Upon receiving the manipulation signal requesting a decrease in the power consumption (the total power consumption of the plural electrical appliances 1) from the controller 3 via the external interface unit 21, the control unit 23 outputs a control signal for making the electrical appliance 1 perform an energy conservation control process necessary for achieving the requested decrease in the power consumption. In this situation, the control signal transmitted to the electrical appliance 1 includes a common control order designating a reduction amount (an individual reduction amount of the power consumption of the electrical appliance 1) of the power consumption.

The aforementioned common control order indicates a reduction amount of the power consumption expressed in a unit defined common to all of the electrical appliances 1. In the present embodiment, such a unit is selected from "%" (percentage), "W" (watt), and a level. Besides, the manipulation signal is corresponding to an energy conservation instruction. In this manipulation signal, the reduction amount of the power consumption is expressed in the same unit (%, W, or level) as the common control order. It is sufficient that the appliance control device 2 is configured to receive the energy conservation instruction indicative of the reduction amount of the power consumption from the outside. For example, the appliance control device 2 may be configured to receive the energy conservation instruction from external premises (e.g., an electric power company) in addition to or as an alternative to the controller 3.

As mentioned in the above, the appliance control device 2 includes the external interface unit 21 and the control unit 23.

The external interface unit 21 is configured to receive energy conservation instruction indicative of a total reduction amount of power consumption of the plural electrical appliances 1 from the external device (controller) 3.

The control unit 23 is configured to, upon acknowledging that the external interface unit 21 receives the energy conservation instruction, send the control signal including the common control order indicative of the individual reduction amount of the power consumption of the electrical appliance 1 to at least one of the plural electrical appliances 1 based on the total reduction amount indicated by the energy conservation instruction.

Further, the appliance control device 2 includes a total power consumption measurement unit 25. The total power consumption measurement unit 25 is configured to measure the total power consumption (i.e., a power consumption of the appliance control system) of the plural electrical appliances 1.

The total power consumption measurement unit 25 is a power meter, for example.

For example, when the external interface unit 21 receives the energy conservation instruction, the control unit 23 obtains the total power consumption (reference total power consumption) from the total power consumption measurement unit 25. Subsequently, the control unit 23 sends the control signal as mentioned in the above. Upon receiving the control signal, the electrical appliance 1 performs the energy conservation control process. After that, the control unit 23 obtains the total power consumption from the total power consumption measurement unit 25 again. The control unit 23 judges whether or not a difference between the reference total power consumption and the current total power consumption is equal to or more than the total reduction amount indicated by the energy conservation instruction. Upon judging that the difference between the reference total power consumption and the current total power consumption is not greater than the total reduction amount indicated by the energy conservation instruction, the control unit 23 sends the control signal including the common control order indicative of the individual reduction amount greater than that of the previous common control order. Upon judging that the difference between the reference total power consumption and the current total power consumption is not less than the total reduction amount indicated by the energy conservation instruction, the control unit 23 terminates the operation.

Figure 3:
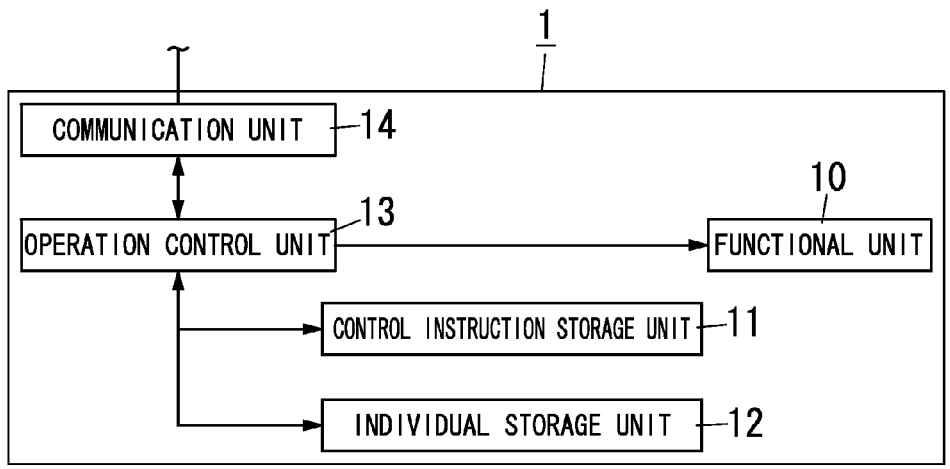
FIG. 3 is a schematic block diagram illustrating the configuration of the electrical appliance of the above first embodiment.

As shown in FIG. 3, each electrical appliance 1 includes a functional unit 10, a control instruction storage unit 11, an individual storage unit 12, and an operation control unit 13, and a communication unit 14.

The communication unit 14 is connected to the communication unit 22 of the appliance control device 2 in order to communicate with appliance control device 2 via the home network.

The functional unit 10 has plural operation states with different power consumption. For example, when the electrical appliance 1 is a lighting fixture, the functional unit 10 has a function of changing a dimming level of a light source, and the operation state of the functional unit 10 is defined by the dimming level (brightness) of the light source. When the electrical appliance 1 is an air conditioner, the functional unit 10 has a function of changing a desired temperature, and the operation state of the functional unit 10 is defined by the desired temperature. When the electrical appliance 1 is a ventilator, the functional unit 10 has a function of controlling an air flow level of the ventilator, and the operation state of the functional unit 10 is defined by the air-flow level (e.g., a low level, a middle level, and a high level).

Further, the functional unit 10 is configured to, upon receiving control instruction mentioned below from the operation control unit 13, perform the energy conservation control process of changing its operation state in accordance with the received control instruction.

The control instruction storage unit 11 is configured to store the plural control instructions (individual control orders) for changing the operation state of the functional unit 10. When the electrical appliance 1 is a lighting fixture, the control instruction indicates "lower the dimming level by one level, "lower the dimming level by two levels", and "lower the dimming level by five levels", for example. When the electrical appliance 1 is an air conditioner, the control instruction indicates "decrease the desired temperature by one degree", "decrease the desired temperature by two degrees", "increase the desired temperature by one degree", and "increase the desired temperature by two degrees", for example. When the electrical appliance 1 is a ventilator, the control instruction indicates "adjust the operation state to the middle level", and "adjust the operation state the low level", for example.

The individual storage unit 12 is configured to store individual control information indicative of a correspondence relation between the individual reduction amount (common control order) and the control instruction (individual control order). For example, when the electrical appliance 1 is a lighting fixture, the individual storage unit 12 is configured to store the individual control information as illustrated in TABLE 1.

The operation control unit 13 is configured to, upon receiving the control signal (when the communication unit 14 receives the control signal from the appliance control device 2), refer to the individual control information stored in the individual storage unit 12. The operation control unit 13 is configured to select, from the plural control instructions stored in the control instruction storage unit 11, the control instruction corresponding to (associated with) the individual reduction amount indicated by the common control order included in the received control signal. The operation control unit 13 is configured to provide the selected control instruction to the functional unit 10.

Besides, the individual storage unit 12 may be configured to be an alternative to the control instruction storage unit 11. In this arrangement, the operation control unit 13 is configured to, upon receiving the control signal (when the communication unit 14 receives the control signal from the appliance control device 2), refer to the individual control information stored in the individual storage unit 12 and provide, to the functional unit 10, the control instruction corresponding to the individual reduction amount indicated by the common control order included in the received control signal.

Besides, the operation control unit 13 may be configured to, upon acknowledging that the functional unit 10 has performed the energy conservation control process, control the communication unit 14 in such a manner to send a notification signal indicative of completion of the energy conservation control process to the appliance control device 2.

For example, upon receiving the control signal including the common control order indicative of the individual reduction amount of 20 W, the operation control unit 13 refers to the individual control information (see TABLE 1) stored in the individual storage unit 12 and selects the control instruction (individual control order) indicating "lower the dimming level by one level" which is associated with the individual reduction amount of 20 W. Thereafter, the operation control unit 13 provides the selected control instruction ("lower the dimming level by one level") to the functional unit 10. The functional unit 10 performs the energy conservation control process in accordance with the received control instruction ("lower the dimming level by one level"). Consequently, the functional unit 10 changes the operation state, thereby lowering the dimming level by one level.

As mentioned in the above, the electrical appliance 1 includes an energy conservation control unit. The energy conservation control unit is configured to, upon receiving the control signal including the common control order, perform the energy conservation control process so as to decrease the power consumption by an amount indicated by the common control order. Besides, the electrical appliance 1 is selected from various appliances such as a lighting fixture, an air conditioner, and a refrigerator. Hence, there are various specific control orders necessary for the electrical appliance 1 to perform the energy conservation control process, depending on types of the electrical appliances. For example, a lighting fixture performs dimming control in order to achieve the energy conservation control process, and an air conditioner increases (or decreases) the desired temperature in order to achieve the energy conservation control process.

In view of the above, each electrical appliance 1 includes an individual storage unit 12. The individual storage unit 12 stores the individual control information indicative of the correspondence relation between the common control order and the individual control order. The individual control order is a specific control order necessary for the electrical appliance 1 to perform the energy conservation control process in accordance with the common control order. Upon receiving the control signal including the common control order, the energy conservation control unit refers to the individual control information stored in the individual storage unit 12, and converts the received common control order to the individual control order, and performs the energy conservation control process in accordance with the resultant individual control order. For example, with regard to a lighting fixture, the individual control order may indicate an increased amount (or a decreased amount) in the dimming level (brightness). With regard to an air conditioner, the individual control order may indicate an increased amount (or a decreased amount) in the desired temperature.

In the present embodiment, the electrical appliance 1 preliminarily stores the correspondence relation between the individual control order and the common control order as the individual control information in the individual storage unit 12. As shown in following TABLE 1, the individual control information is defined as a table in which the plural common control orders are respectively associated with the individual control orders. Alternatively, the individual control information may be defined as a conversion equation for converting the common control order to the individual control order.

TABLE 1

| common control order | individual control order |
| --- | --- |
| 20 W | lower the dimming level by one level |
| 40 W | lower the dimming level by two levels |
| . | |
| . | |
| . | |
| 100 W | lower the dimming level by five levels |

In the present embodiment, the appliance control device 2 monitors the total power consumption of all of the electric appliances 1 by use of a power meter. Upon receiving the energy conservation instruction, the appliance control device 2 repeats varying the common control order and sending the control signal including the varied common control order until the total power consumption is decreased by the reduction amount indicated by the energy conservation instruction.

For example, it is assumed that the three common control orders include level 1, level 2, and level 3. When the appliance control device 2 receives the energy conservation instruction, first, the appliance control device 2 sends the control signal including the common control order of level 1 to all of the electrical appliances 1. In this situation, the appliance control device 2 measures the reduction amount in the total power consumption of all of the electrical appliances 1. When the measured reduction amount does not reach the reduction amount indicated by the energy conservation instruction, the appliance control device 2 sends the control signal including the common control order of level 2 to all of the electrical appliances 1. Even so, when the measured reduction amount does not reach the reduction amount indicated by the energy conservation instruction, the appliance control device 2 sends the control signal including the common control order of level 3 to all of the electrical appliances 1.

As mentioned in the above, the appliance control device 2 varies the common control order gradually until the reduction amount in the total power consumption reaches the reduction amount indicated by the energy conservation instruction. Consequently, it is possible to make the electrical appliance 1 perform the energy conservation control process in accordance with the energy conservation instruction from a user.

Further, the control unit 23 may be configured to send the same common control order to all of the electrical appliances 1.

For example, when the unit of the total reduction amount is the watt (W), the control unit 23 is configured to transmit, to all of the electrical appliances $1_1, 1_2, \ldots, 1_n$, the common control order indicative of the individual reduction amount identical to an amount calculated by dividing the total reduction amount indicated by the energy conservation instruction by the number of the electrical appliances 1. For example, the appliance control system includes the five electrical appliances $1_1$ to $1_5$. When the external interface unit 21 receives the energy conservation instruction indicative of the total reduction amount of 100 W, the control unit 23 transmits the common control order indicative of the individual reduction amount of 20 W to all of the five electrical appliances $1_1$ to $1_5$. Each electrical appliance 1 performs the energy conservation control process associated with the individual reduction amount of 20 W. Consequently, power consumption of each electrical appliance 1 is decreased by 20 W. Thus, the total power consumption is decreased by 100 W. As mentioned in the above, when the unit of the total reduction amount is the watt (W), all of the electrical appliances 1 can have the same decreased amount of the power consumption.

For example, when the unit of the total reduction amount is the percentage (%), the control unit 23 is configured to transmit, to all of the electrical appliances $1_1, 1_2, \ldots, 1_n$, the common control order indicative of the individual reduction amount identical to the total reduction amount indicated by the energy conservation instruction. For example, the appliance control system includes the five electrical appliances $1_1$ to $1_5$. When the external interface unit 21 receives the energy conservation instruction indicative of the total reduction amount of 10%, the control unit 23 transmits the common control order indicative of the individual reduction amount of 10% to all of the five electrical appliances $1_1$ to $1_5$. In this example, the electrical appliances $1_1$ to $1_5$ have power consumption of 500 W, 300 W, 100 W, 150 W, and 450 W, respectively. The total power consumption is 1500 W. The total reduction amount of 10% is corresponding to 150 W. When each electrical appliance 1 performs the energy conservation control process associated with the individual reduction amount of 10%, the power consumption of the electrical appliance $1_1$ is decreased by 50 W, and the power consumption of the electrical appliance $1_2$ is decreased by 30 W, and the power consumption of the electrical appliance $1_3$ is decreased by 10 W, and the power consumption of the electrical appliance $1_4$ is decreased by 15 W, and the power consumption of the electrical appliance $1_5$ is decreased by 45 W. Consequently, the total power consumption is decreased by 150 W. As mentioned in the above, when the unit of the total reduction amount is the percentage (%), all of the electrical appliances 1 can have the same decrease ratio of the power consumption.

In addition, the appliance control device 2 is configured to, after a lapse of predetermined time (e.g., 30 minutes) from the time at which the appliance control device 2 sends the control signal including the common control order to the electrical appliances 1 to reduce the power consumption of the electrical appliances 1, send control signals to terminate the energy conservation control processes of the electrical appliances 1. Hence, continuous time during which the electrical appliance 1 reduces its power consumption in response to receipt of the control signal from the appliance control device 2 is limited to the predetermined time.

The appliance control system of the present embodiment includes the plural electrical appliances 1 and the appliance control device 2 configured to transmit the control signal for controlling the electrical appliances 1 to the electrical appliances 1. The appliance control device 2 includes the external interface unit 21 and the control unit 23. The external interface unit 21 is configured to receive the energy conservation instruction indicative of the reduction amount of the power consumption from the outside. The control unit 23 is configured to, upon acknowledging that the external interface unit 21 receives the energy conservation instruction, send the control signal including the common control order indicative of the reduction amount of the power consumption expressed in the unit defined common to the plural electrical appliances 1 in response to the energy conservation instruction. The electrical appliance 1 includes the individual storage unit 12 and the energy conservation control unit. The individual storage unit 12 is configured to store, as the individual control information, the correspondence relation between the common control order and the individual control order used for the performance of the energy conservation control process corresponding to the reduction amount indicated by the common control order. The energy conservation control unit is configured to, upon receiving the control signal including the common control order, refer to the individual control information stored in the individual storage unit 12 and convert the common control order to the individual control order and perform the energy conservation control process in accordance with the individual control order.

In other words, the appliance control system of the present embodiment includes the plural electrical appliances 1 configured to operate with electrical power supplied from the external power source, and the appliance control device 2 connected to the plural electrical appliances 1. The appliance control device 2 includes the external interface unit 21, and the control unit 23. The external interface unit 21 is configured to receive the energy conservation instruction indicative of the total reduction amount of the power consumption of the plural electrical appliances 1 from the external device. The control unit 23 is configured to, upon acknowledging that the external interface unit 21 receives the energy conservation instruction, send the control signal including the common control order indicative of the individual reduction amount of the power consumption of the electrical appliance 1 to at least one of the plural electrical appliances 1 based on the total reduction amount indicated by the energy conservation instruction. Each electrical appliance 1 includes the functional unit 10, the control instruction storage unit 11, the individual storage unit 12, and the operation control unit 13. The functional unit 11 has the plural operation states with the different power consumption. The control instruction storage unit 11 is configured to store the plural control instructions for changing the operation state of the functional unit 10. The individual storage unit 12 is configured to store the individual control information indicative of the correspondence relation between the individual reduction amount and the control instruction. The operation control unit 13 is configured to, upon receiving the control signal, refer to the individual control information stored in the individual storage unit 12, and select, from the plural control instructions stored in the control instruction storage unit 11, the control instruction corresponding to the individual reduction amount indicated by the common control order included in the received control signal, and provide the selected control instruction to the functional unit 10. The functional unit 10 is configured to, upon receiving the control instruction from the operation control unit 13, perform the energy conservation control process of changing its operation state in accordance with the received control instruction.

As explained in the above, according to the appliance control system of the present embodiment, each electric appliance 1 which has received the control signal including the common control order converts the received common control order to the individual control order and then performs the energy conservation control process associated with the individual control order. Hence, it is unnecessary for a user to know the individual control order peculiar to the electric appliance 1. In brief, it is sufficient that a user controls the controller 3 to input a desired reduction amount of the total power consumption of the electrical appliances 1. Thus, such a user is not required to know the details of the energy conservation control process of each electrical appliance 1. Consequently, the appliance control system of the present embodiment can reduce the total power consumption of the plural electric appliances 1 without providing individual instructions of energy conservation control processes for the respective electrical appliances 1.

Figure 4:
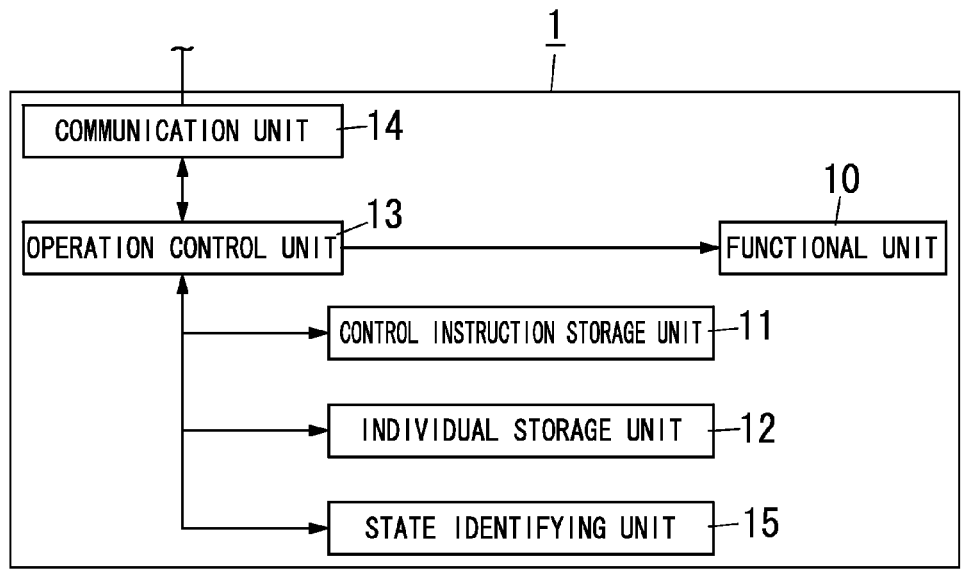
FIG. 4 is a schematic block diagram illustrating the configuration of the electrical appliance of the first modification of the above first embodiment.

In the first modification of the appliance control system of the present embodiment, as shown in FIG. 4, the electrical appliance 1 includes a state identifying unit 15 in addition to the functional unit 10, the control instruction storage unit 11, the individual storage unit 12, the operation control unit 13, and the communication unit 14.

The state identifying unit 15 is configured to identify the current operation state of the functional unit 10. For example, the state identifying unit 15 identifies the current operation state of the functional unit 10 based on the control instruction provided to the functional unit 10 from the operation control unit 13. Alternatively, the state identifying unit 15 may obtain the current operation state from the functional unit 10.

The individual storage unit 12 is configured to store the individual control information for each operation state of the functional unit 10. For example, when the electrical appliance 1 is a ventilator, as shown in TABLE 2, the individual storage unit 12 stores the individual control information indicative of the correspondence relation of the common control order (individual reduction amount) and the individual control order (control instruction) with regard to the operation state of the "high level", and the individual control information indicative of the correspondence relation of the common control order and the individual control order with regard to the operation state of the "middle level".

The operation control unit 13 is configured to, upon receiving the control signal, refer to the individual control information stored in the individual storage unit 12 corresponding to (associated with) the current operation state identified by the state identifying unit 15, and select, from the plural control instructions stored in the control instruction storage unit 11, the control instruction corresponding to (associated with) the individual reduction amount indicated by the common control order included in the received control signal, and provide the selected control instruction to the functional unit 10.

For example, the current operation state identified by the state identifying unit 15 is the "high level", and the individual reduction amount indicated by the common control order included in the received control signal is "20 W". According to TABLE 2, the operation control unit 13 selects the control instruction ("adjust the operation state to the "middle level"") and provides the selected control instruction to the functional unit 10. For example, the current operation state identified by the state identifying unit 15 is the "middle level", and the individual reduction amount indicated by the common control order included in the received control signal is "10 W".

The operation control unit 13 selects the control instruction ("adjust the operation state to the "low level"") and provides the selected control instruction to the functional unit 10.

As mentioned in the above, in another instance of the present embodiment, each electrical appliance 1 may include the state identifying unit 15 configured to obtain the current operation state as the present state. When the electrical appliance 1 is a lighting fixture, the operation state means the lighting level. When the electrical appliance 1 is an air conditioner, the operation state means the desired temperature. When the electrical appliance 1 is a ventilator, the operation state means the air-flow level (e.g., the low level, the middle level, and the high level). Such an operation state is not limited to the above instances. The individual storage unit stores, for each operation state, the correspondence relation between the common control order and the individual control order as the individual control information. The energy conservation control unit converts the common control order to the individual control order with reference to the individual control information associated with the present state identified by the state identifying unit.

In brief, to perform the energy conservation control process for reducing the power consumption by an amount corresponding to the received common control order, the electrical appliance 1 changes its operation state in line with the individual control order associated with the common control order in the individual control information. For example, the following ventilator can be used. In this ventilator, with changing the operation state from the "high level" to the "middle level", it is possible to decrease the power consumption by 20 W. With changing the operation state from the "high level" to the "low level", it is possible to decrease the power consumption by 30 W.

In this ventilator, as shown in following TABLE 2, the common control order "20 W" and the individual control order (change the operation state to the "middle level") are stored in association with the operation state of the "high level". The common control order "30 W" and the individual control order (change the operation state to the "low level") are also stored in association with the operation state of the "high level". Similarly, the common control order "10 W" and the individual control order (change the operation state to the "low level") are stored in association with the operation state of the "middle level".

TABLE 2

| operation state | common control order | individual control order |
|---|---|---|
| high-level | 20 W | change the operation state to the "middle-level" |
|  | 30 W | change the operation state to the "low-level" |
| middle level | 10 W | change the operation state to the "low-level" |

Consequently, upon receiving the control signal including the common control order "20 W" while the preset state is the "high level", the energy conservation control unit refers to the individual control information and performs the energy conservation control process to change the operation state to the "middle level". Similarly, upon receiving the control signal including the common control order "30 W" while the preset state is the "high level", the energy conservation control unit refers to the individual control information and performs the energy conservation control process to change the operation state to the "low level".

Figure 5:
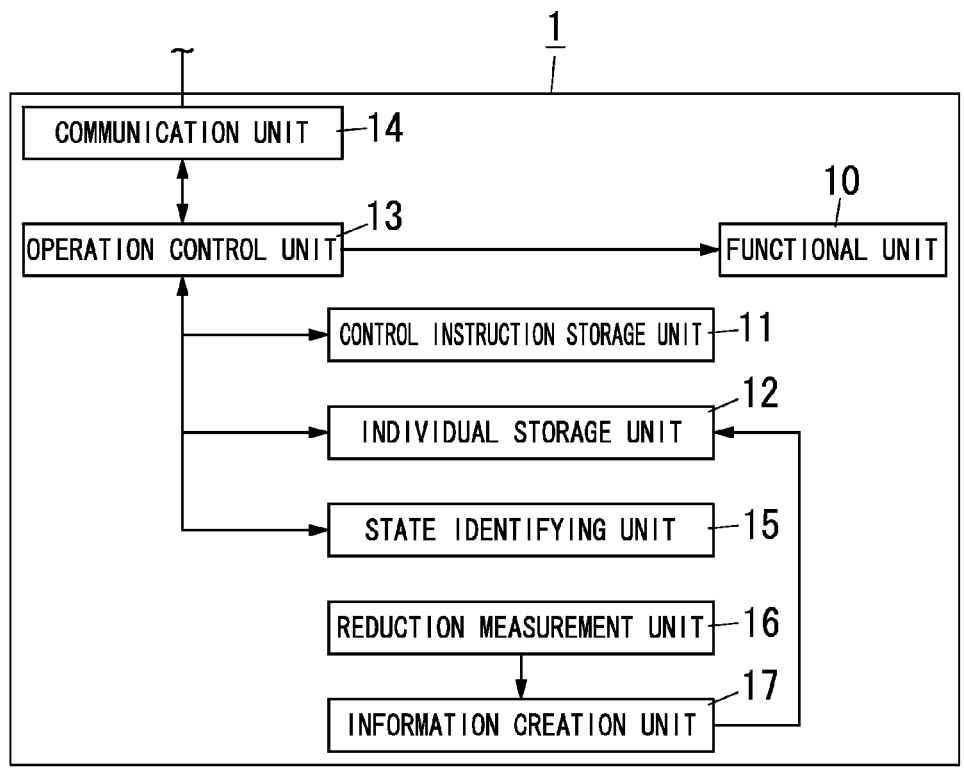
FIG. 5 is a schematic block diagram illustrating the configuration of the electrical appliance of the second modification of the above first embodiment.

In the second modification of the appliance control system of the present embodiment, as shown in FIG. 5, each electrical appliance 1 includes a reduction measurement unit 16 and an information creation unit 17 in addition to the functional unit 10, the control instruction storage unit 11, the individual storage unit 12, the operation control unit 13, the communication unit 14, and the state identifying unit 15.

The reduction measurement unit 16 is configured to measure a difference in the power consumption of the functional unit 10 between the previous operation state and the current operation state. The previous operation state is defined as the operation state of the functional unit 10 before performance of the energy conservation control process in response to receipt of the control instruction by the functional unit 10. The current operation state is defined as the operation state of the functional unit 10 after the performance of the energy conservation control process by the functional unit 10. For example, the reduction measurement unit 16 includes a power meter configured to measure the power consumption of the functional unit 10. Upon acknowledging that the power consumption of the functional unit 10 is decreased by not less than a predetermined threshold, the reduction measurement unit 16 judges that the operation state of the functional unit 10 has been changed, and outputs the reduction amount of the power consumption of the functional unit 10 as the difference in the power consumption. Alternatively, the reduction measurement unit 16 may store, as reference power consumption, the power consumption of the functional unit 10 with the previous operation state which is defined as the operation state of the functional unit 10 before performance of the energy conservation control process in response to receipt of the control instruction by the functional unit 10. In this arrangement, upon acknowledging that the functional unit 10 performs the energy conservation control process, the reduction measurement unit 16 measures the power consumption of the functional unit 10, and calculates a difference between the measured power consumption and the reference power consumption to obtain the difference in the power consumption.

The information creation unit 17 is configured to create the individual control information regarding the previous operation state by associating the control instruction provided to the functional unit 10 with the difference of the power consumption measured by the reduction measurement unit 16 as the individual reduction amount. When the individual reduction amount is expressed in the unit of the watt (W), the difference in the power consumption is used as the individual reduction amount without any change. In contrast, when the individual reduction amount is expressed in the unit of the percentage (%), the difference in the power consumption is converted to its equivalent in the unit of the percentage. Similarly, when the individual reduction amount is expressed in the unit of the level, the difference in the power consumption is converted to its equivalent in the unit of the level. The information creation unit 17 is configured to, upon creating the individual control information, update the individual control information stored in the individual storage unit 12 with the created individual control information.

As mentioned in the above, the electrical appliance 1 may be configured to adopt a result of the actually performed energy conservation control process as the individual control information, and store this individual control information in the individual storage unit. In this arrangement, the electrical appliance 1 includes the reduction measurement unit 16 and the information creation unit 17. The reduction measurement unit 16 is configured to measure the reduction amount of the power consumption. The information creation unit 17 is configured to store the individual control information in the individual control storage unit. When the operation state is changed as a result of the energy conservation control process, the reduction measurement unit measures an amount of the reduction from the power consumption before the change of the operation state to the power consumption after the change of the operation state. The information creation unit stores a correspondence relation between a measurement result of the variation measurement unit and the change in the operation state in a situation where this measurement result is observed, in the individual storage unit, as the individual control information.

In the instance of the above ventilator, when the operation state is changed from the "high level" to the "middle level", the reduction measurement unit measures the reduction amount "20 W" of the power consumption. The information creation unit adopts this reduction amount "20 W" as the common control order. The information creation unit creates a correspondence relation by associating the change in the operation state from the "high level" to the "middle level" with the common control order as the individual control order. The information creation unit stores the correspondence relation in the individual storage unit as the individual control information.

Besides, in the appliance control system, an application range of the energy conservation control process may be designated for each type of the electrical appliance 1. In this arrangement, a user may manipulate the controller 3 to designate the type of the electrical appliance 1. The control unit 23 sends the control signal only to the designated electrical appliance 1. Hence, the electric appliances 1 as candidates of the energy conservation control process can be selected in accordance with a user's preference. Additionally or alternatively, the application range of the energy conservation control process can be designated for each area (e.g., a room) in which the electrical appliances 1 are installed, for example.

Second Embodiment

The appliance control system of the present embodiment is different from the appliance control system of the first embodiment in that the energy conservation instruction which is received by the appliance control device 2 from the controller 3 includes a parameter for defining a time period for the reduction of the power consumption. In brief, in the present embodiment, the energy conservation instruction includes the total reduction amount and an energy conservation time period indicative of a continuous time period of the energy conservation control process.

In other words, in the present embodiment, the energy conservation instruction indicates the reduction amount of the power consumption as electric energy. For example, the energy conservation instruction indicates reducing electrical power by 100 W for 2 hours (=200 Wh). Accordingly, a user can request the energy conservation control process by designating electrical energy by use of the controller 3. Consequently, it is easy for a user to estimate how much energy conservation effect the energy conservation control process has. Besides, the energy conservation instruction given to the appliance control device 2 from the controller 3 may indicate an amount expressed as an electric rate instead of electric energy.

In the present embodiment, the appliance control device 2 includes the time period (energy conservation time period) indicated by the energy conservation instruction in addition to the common control order in the control signal and sends the control signal to the electrical appliance 1. Upon receiving this control signal, the electrical appliance 1 keeps performing the energy conservation control process in accordance with the common control order for the time period (energy conservation time period) indicated by the energy conservation instruction. In brief, the functional unit 10 changes the operation state in accordance with the received control instruction and keeps the current operation state only for the energy conservation time period.

In the electrical appliance 1 of the present embodiment, the individual storage unit 12 is configured to store an allowed continuous time period for which the functional unit 10 of the electrical appliance 1 can continue performing the energy conservation control process associated with the common control order. The operation control unit 13 is configured to, upon receiving the energy conservation instruction, refer to the individual storage unit 12, and retrieve the allowed continuous time period associated with the energy conservation control process which is performed by the functional unit 10 in accordance with the power conservation instruction, and prohibit the functional unit 10 from performing the energy conservation control process upon acknowledging that the allowed continuous time period is equal to or less than the energy conservation time period included in the energy conservation instruction. In other words, when the allowed continuous time period is not greater than the energy conservation time period included in the energy conservation instruction, the operation control unit 13 does not provide the control instruction to the functional unit 10.

When the energy conservation instruction includes the time element as mentioned in the above, the individual storage unit 12 of each electrical appliance 1 is also used as a time storage unit configured to store the allowed continuous time period for each common control order. In the present embodiment, the allowed continuous time period means a time period for which the energy conservation control process in accordance with the common control order is permitted to be continued. For example, with regard to a refrigerator, when the energy conservation control process of reducing the power consumption by 100 W is continued for a period equal to or more than one hour, food is likely to spoil. Therefore, the allowed continuous time period of the common control order "100 W" is selected to be one hour. It is assumed that the allowed continuous time period is determined for each electrical appliance 1 by a user at the time of the installation of the appliance control system. Besides, the allowed continuous time period may be preliminarily recorded in the electrical appliance 1.

Further, in the present embodiment, the electrical appliance 1 includes the time period judging unit (the operation control unit 13 in the present embodiment). The time period judging unit is configured to refer to the allowed continuous time period in the individual storage unit. The time period judging unit is configured to allow the energy conservation control unit to perform the energy conservation control process so long as the energy conservation control process is permitted to continue for a time period not less than the time period designated by the energy conservation instruction. In more detail, the time period judging unit allows the energy conservation control unit to perform the energy conservation control process so long as the allowed continuous time period associated with the common control order gives no temporal limitation or so long as the allowed continuous time period associated with the common control order exceeds the time period indicated by the energy conservation instruction even when the allowed continuous time period gives temporal limitations. In other words, upon receiving the control signal from the appliance control device 2, each electrical appliance 1 performs the energy conservation control process so long as the energy conservation control process indicated by the control signal can be continued for a time period not less than the time period indicated by the energy conservation instruction. In brief, only when the allowed continuous time period associated with the common control order included in the control signal exceeds the time period indicated by the control signal, the electrical appliance 1 converts the common control order to the individual control order and performs the energy conservation control process associated with the individual control order.

As mentioned in the above, the each electrical appliance 1 in the present embodiment includes the time period storage unit (the individual storage unit 12) and the time period judging unit (the operation control 13). The energy conservation instruction further includes the energy conservation time period indicative of the continuous time period of the energy conservation control process. The time period storage unit is configured to store the allowed continuous time period for which the functional unit 10 of the electrical appliance 1 is allowed to continue the energy conservation control process associated with the common control order. The time period judging unit is configured to, upon receiving the energy conservation instruction, refer to the time period storage unit, and retrieve the allowed continuous time period associated with the energy conservation control process which is performed by the functional unit 10 in accordance with the power conservation instruction, and prohibit the functional unit 10 from performing the energy conservation control process upon acknowledging that the allowed continuous time period is equal to or less than the energy conservation time period included in the energy conservation instruction.

As explained in the above, the common control order is associated with the allowed continuous time period. Therefore, the electrical appliance 1 can perform the energy conservation control process with the time limitation. In brief, when the energy conservation instruction includes a factor regarding a time period, the electrical appliance 1 can perform the energy conservation control process within the allowable range of the electrical appliance 1.

Alternatively, functions of the time period storage unit and the time period judging unit may be provided to not the electrical appliance 1 but the appliance control device 2. In this arrangement, the time period storage unit stores the correspondence relation between the common control order and the allowed continuous time period for each electrical appliance 1. The appliance control device 2 refers to the allowed continuous time period, and sends the control signal including the common control order to only the electrical appliance 1 which can continue the energy conservation control process for a time period not less than the time period designated by the energy conservation instruction.

The other configurations and functions are same as the first embodiment.

Third Embodiment

The appliance control system of the present embodiment is different from the appliance control system of the first embodiment in that the appliance control device 2 selects the control order performed by the electrical appliance 1 in consideration of an energy conservation capability of the electrical appliance 1.

In the appliance control device 2 of the present embodiment, the storage unit 24 is configured to store, for each electrical appliance 1, the energy conservation capability indicative of a decreased amount of the power consumption caused by the performance of the energy conservation control process by the functional unit 10. For example, as shown in following TABLE 3, the storage unit 24 stores the energy conservation capabilities (expressed in the unit of the percentage) of 10%, 20%, and 50% with regard to the electrical appliance $1_1$. The energy conservation capability expressed in the unit of the percentage is calculated based on rated power consumption. The energy conservation capability of "10%" is corresponding to the reduction amount of 50 W, and the energy conservation capability of "20%" is corresponding to the reduction amount of 100 W, and the energy conservation capability of "50%" is corresponding to the reduction amount of 250 W. The energy conservation capability expressed in the unit of the watt (W) means the power consumption to be reduced.

The control unit 23 is configured to, upon acknowledging that the external interface unit 21 receives the energy conservation instruction, refer to the storage unit 24, and select at least one combination of the electrical appliance 1 and the energy conservation capability such that the energy conservation capability or the sum of the energy conservation capabilities is equal to or more than the total reduction amount indicated by the energy conservation instruction, and send the control signal including the common control order indicative of the individual reduction amount corresponding to the energy conservation capability to the selected electrical appliance 1. Besides, the control unit 23 may have an upper limit of the energy conservation capability or the sum of the energy conservation capabilities in order to prevent a great decrease in the power consumption. In other words, the control unit 23 may be configured to select at least one combination of the electrical appliance 1 and the energy conservation capability such that the energy conservation capability or the sum of the energy conservation capabilities is not less than the total reduction amount indicated by the energy conservation instruction and is not greater than the upper limit. The upper limit is determined based on the total reduction amount indicated by the energy conservation instruction. For example, the upper limit is defined as an amount obtained by adding a predetermined amount to the total reduction amount. The predetermined amount may be a fixed amount or a variable amount determined based on the total reduction amount (e.g., 10% of the total reduction amount).

For example, when the total reduction amount indicated by the energy conservation instruction is 250 W, the control unit 23 refers to the storage unit 24 and selects the combination of the electrical appliance $1_1$ and the energy conservation capability of "50%" such that the energy conservation capability is not less than 250 W. In this situation, the control unit 23 transmits the control signal including the common control order "50%" corresponding to the energy conservation capability "50%" to the selected one electrical appliance $1_1$. Alternatively, the control unit 23 selects the combination of the electrical appliance $1_1$ and the energy conservation capability of "100 W", the combination of the electrical appliance $1_2$ and the energy conservation capability of "100 W", and the combination of the electrical appliance $1_n$ and the energy conservation capability of "50%" such that the sum of the energy conservation capabilities is not less than 250 W. The sum of the energy conservation capabilities is 275 W. In this situation, the control unit 23 transmits the control signal including the common control order "100 W" corresponding to the energy conservation capability "100 W" to the selected electrical appliance $1_1$, the control signal including the common control order "100 W" corresponding to the energy conservation capability "100 W" to the selected electrical appliance $1_2$, and the control signal including the common control order "50%" corresponding to the energy conservation capability "50%" to the selected electrical appliance $1_n$.

In the present embodiment, the storage unit 24 of the appliance control device 2 constitutes a capability storage unit configured to store, for each electrical appliance 1, the amount of the power consumption which is decreased due to the performance of the prescribed energy conservation control process, as the energy conservation capability. The energy conservation capability is an amount expressed in the unit defined common to all of the electrical appliances 1, and indicates the amount of the power consumption which is decreased due to the performance of the energy conservation control process by the electrical appliance 1. Each electrical appliance 1 has at least one energy conservation capability. One electrical appliance 1 may have the plural energy conservation capabilities. Three units of "%" (percentage), "W" (watt), and the level are examples of the unit used for the energy conservation capability.

In the present embodiment, the storage unit 24 stores the energy conservation capabilities with regard to all the electrical appliances 1 constituting the appliance control system as the control table shown in following TABLE 3.

TABLE 3

| | power consumption (W) | % expression (%) | W expression (W) | level expression |
|---|---|---|---|---|
| electrical appliance $1_1$ | 500 | 10, 20, 50 | 20, 50, 100 | 1, 2, 3 |
| electrical appliance $1_2$ | 200 | nothing | 50, 100 | nothing |
| . | | | | |
| . | | | | |
| electrical appliance $1_n$ | 150 | 50 | nothing | 1, 2 |

In brief, in the instance shown in TABLE 3, the electrical appliance $1_1$ has the total nine energy conservation capabilities including the three energy conservation capabilities in percentage of 10, 20, and 30(%), the three energy conservation capabilities in watts of 20, 50, and 100 (W), and the three energy conservation capabilities in levels of 1, 2, and 3. In brief, the control table shown in TABLE 3 illustrates that the electrical appliance $1_1$ can perform the energy conservation control processes respectively associated with nine energy conservation capabilities.

Similarly, in TABLE 3, the electrical appliance $1_2$ has no energy conservation capabilities in percentage and in levels. The electrical appliance $1_2$ has only two energy conservation capabilities in watts of 50 and 100 (W). The electrical appliance $1_n$ also has no energy conservation capabilities in watts. The electrical appliance $1_n$ has the total three energy conservation capabilities including the single energy conservation capabilities in percentage of 50(%), and the two energy conservation capabilities in levels of 1 and 2. In TABLE 3, the item "power consumption" indicates the rated power consumption of the corresponding electrical appliance 1.

In the present embodiment, the control table stored in the storage unit 24 is preliminarily determined and fixed at the time of starting up the appliance control system (at the time of turning on the appliance control device 2). For example, the appliance control device 2 includes an input unit (not shown) used for input of the energy conservation capability of the electrical appliance 1 into the storage unit 24. The appliance control device 2 also is configured to allow a user to directly input the energy conservation capability by use of the input unit offline. Besides, the controller 3 may be used as an alternative to the input unit. Even when the appliance control device 2 is configured to unilaterally send a signal to the electrical appliance 1 in a similar manner as an infrared remote transmitter, it is possible to record the energy conservation capability for each electrical appliance 1 in the storage unit 24.

The control unit 23 of the appliance control device 2 outputs the control signal for controlling the electrical appliance 1 to perform the energy conservation control process in accordance with the energy conservation capability stored in the storage unit 24. In other words, upon receiving the manipulation signal requesting a decrease in the power consumption from the controller 3 via the external interface unit 21, the control unit 23 refers to the energy conservation capabilities stored in the storage unit 24 and selects the energy conservation capability necessary for achieving the requested decrease in the power consumption.

It is sufficient that the control unit 23 selects at least one combination of the electrical appliance 1 and the energy conservation capability such that the energy conservation control process of reducing an amount corresponding to the reduction amount of the power conservation instruction indicated by the energy conservation instruction is performed.

Upon selecting the combination of the electrical appliance 1 and the energy conservation capability, the control unit 23 sends the control signal to the selected electrical appliance 1 via the communication unit 22 such that the selected electrical appliance 1 performs the energy conservation control process associated with the selected energy conservation capability. As shown in FIG. 6(a), the control signal sent to the electrical appliance 1 includes the common control order d1 corresponding to the selected energy conservation capability. In brief, when the control unit 23 selects the combination of the electrical appliance $1_1$ and the energy conservation capability "100 W" with reference to the control table shown in TABLE 3, the control unit 23 sends the control signal including the common control order "100 W" to the electrical appliance $1_1$.

The control unit 23 of the appliance control device 2 selects the combination of the electrical appliance 1 and the energy conservation capability in conformity with a predetermined selection condition. In the present embodiment, the control table in the storage unit 24 preliminarily includes a priority indicative of a priority order for each energy conservation capability. The control unit 23 selects the energy conservation capability in conformity with the priorities.

In brief, upon receiving the manipulation signal requesting a decrease in the power consumption from the controller 3, the control unit 23 refers to the storage unit 24, and selects the energy conservation capability necessary for achieving the requested decrease in the power consumption. When there are plural candidates for the appropriate energy conservation capability, the control unit 23 selects the energy conservation capability in order of the priorities of the energy conservation capabilities such that the energy conservation capability having a higher priority than the others is selected. In other words, the storage unit (capability storage unit) 24 is configured to store the energy conservation capabilities respectively corresponding to the operation states of the functional unit 10, and the priorities (energy conservation priority orders) respectively allocated to the energy conservation capabilities. the control unit 23 is configured to select the energy conservation capability in conformity with the energy conservation priority orders stored in the capability storage unit 24 in a process of selecting at least one combination of the electrical appliance 1 and the energy conservation capability such that the energy conservation capability or the sum of the energy conservation capabilities is equal to or more than the total reduction amount indicated by the energy conservation instruction.

For example, it is assumed that the appliance control system includes the three electrical appliances $1_1$, $1_2$, and $1_3$. Further, the electrical appliances $1_1$, $1_2$, and $1_3$ have the priorities of "1", "2", and "3", respectively. The larger number means the higher priority. In this instance, the control unit 23 selects the electrical appliance 1 in descending order of the priority.

For example, the control unit 23 receives the energy conservation instruction indicative of the total reduction amount of 500 W. In this situation, when the electrical appliance $1_1$ with the highest priority has the energy conservation capability of 500 W, the control unit 23 selects only the electrical appliance $1_1$ and sends the common control order indicative of the individual reduction amount of 500 W to the electrical appliance $1_1$. In brief, when the electrical appliance $1_1$ with the highest priority has the energy conservation capability not less than the total reduction amount, the control unit 23 selects only the electrical appliance 1 with the highest priority.

When the electrical appliance $1_1$ has the maximum energy conservation capability of 200 W, the control unit 23 selects the electrical appliance $1_1$ having the highest priority, and also selects the electrical appliance $1_2$ having the second highest priority. When the electrical appliance $1_2$ has the energy conservation capability of 300 W, the control unit 23 sends the common control order indicative of the individual reduction amount of 200 W to the electrical appliance $1_1$ and also sends the common control order indicative of the individual reduction amount of 300 W to the electrical appliance $1_2$. In brief, when the electrical appliance $1_1$ with the highest priority has the energy conservation capability less than the total reduction amount, the control unit 23 uses the electrical appliance $1_2$ having the highest priority next to the electrical appliance $1_1$ to compensate for a shortage of the individual reduction amount.

In contrast, when the electrical appliance $1_2$ has the maximum energy conservation capability of 200 W, the control unit 23 selects the electrical appliance $1_3$ having the highest priority next to the electrical appliance $1_2$ in addition to the electrical appliances $1_1$ and $1_2$. Thereafter, the control unit 23 sends the common control order indicative of the individual reduction amount of 200 W to the electrical appliance $1_1$ and also sends the common control order indicative of the individual reduction amount of 200 W to the electrical appliance $1_2$ and additionally sends the common control order indicative of the individual reduction amount of 100 W to the electrical appliance $1_3$.

The priority allocated to the energy conservation capability is a discrete value determined in consideration of a degree of an effect caused by the performance of the energy conservation control process associated with the reduction amount corresponding to the energy conservation capability. In brief, the higher priority is allocated to the energy conservation capability which shows the lower degree of the effect on a living environment of a user caused by the performance of the associated energy conservation control process. In contrast, the lower priority is allocated to the energy conservation capability which shows the higher degree of the effect on a living environment of a user caused by the performance of the associated energy conservation control process. For example, when the electrical appliance 1 is a lighting fixture, the brightness of the lighting fixture is decreased with an increase in the reduction amount of the power consumption. Hence, the degree of the effect on the living environment is increased with an increase in the reduction amount of the power consumption. The degree of the effect is classified into three levels: "high level", "middle level", and "low level".

Consequently, the appliance control device 2 controls the electrical appliance 1 to preferentially perform the high-priority energy conservation control process. Therefore, the effect on the living environment of the user caused by the performance of the energy conservation control process can be reduced. In other words, even when the energy conservation control process is performed, the living environment of the user after the performance of the energy conservation control is not so changed from the living environment of the user before the performance of the energy conservation control. Thus, the change in the environment can be minimized.

In addition, the priority may be varied with a season, a time period, or a user's preference. With varying the priority as mentioned in the above, the energy conservation control process can be performed under a more appropriate condition. For example, the time period corresponding to day time in which external light comes into a room shows the lower degree of the effect on the living environment caused by the performance of the energy conservation control process of a lighting fixture relative to the time period corresponding to nighttime. Therefore, the priorities are varied such that the overall priorities regarding the lighting fixture are increased For example, the storage unit (capability storage unit) 24 is configured to store the priorities (appliance priority orders) allocated to the respective electrical appliances 1 based on a type of the electrical appliance 1. In this arrangement, the control unit 23 is configured to select the electrical appliance 1 in conformity with the appliance priority orders stored in the storage unit (capability storage unit) 24 in a process of selecting at least one combination of the electrical appliance 1 and the energy conservation capability such that the energy conservation capability or the sum of the energy conservation capabilities is equal to or more than the total reduction amount indicated by the energy conservation instruction.

As mentioned in the above, the priority is preliminarily determined in accordance with the type of the electrical appliance 1 for each type of the electrical appliance 1. For example, the electrical appliance 1 is classified into various types such as a lighting type, an air conditioning type, a boiler type, an amusement type (e.g., audio-visual equipment), a washing type (e.g., a laundry machine and a drying machine), a cooking type (e.g., a refrigerator and a microwave oven), and a kitchen type (e.g., a dishwasher). In this instance, the priority is predetermined for each type. For example, the priorities of the air conditioning type, the lighting type, . . . , the cooking type are lowered in this order.

As mentioned in the above, the priority is determined for each type of the electrical appliance 1. Consequently, when there are the plural electrical appliances 1 capable of reducing the same amount of the power consumption, the high-priority electrical appliance 1 performs the energy conservation control process preferentially. Therefore, a user can determine the priority arbitrarily in consideration of a harmful effect on the living environment caused by the performance of the energy conservation control process. For example, when the user cannot accept dimming the lighting fixture but can accept turning down the air conditioner in order to reduce the power consumption, the electrical appliance of the air conditioning type may have the priority higher than the electrical appliance of the lighting type such that the electrical appliance of the air conditioning type performs the energy conservation control process preferentially.

Next, the following explanation is made to the operation of the appliance control system with the above configuration. In the following explanation, the appliance control system adopts the control table shown in TABLE 3.

Upon receiving the instruction indicative of decreasing the power consumption by 100 W, the appliance control device 2 refers to the control table stored in the storage unit 24, and selects at least one combination of the electrical appliance 1 and the energy conservation capability so as to achieve the reduction of 100 W. The appliance control device 2 sends the control signal including the common control order associated with the selected energy conservation capability to the selected electrical appliance 1. As an example, the appliance control device 2 sends the control signal including the common control order "100 W" to the electrical appliance $1_1$. Upon receiving the control signal, the electrical appliance $1_1$ refers to the individual control information and converts the common control order included in the control signal to the individual control order and then performs the energy conservation control process designated by the individual control order. As a result, the current power consumption of the electrical appliance $1_1$ is lower by 100 W than the power consumption of the electrical appliance $1_1$ before the receipt of the control signal.

In another instance, upon receiving the instruction indicative of decreasing the power consumption by 250 W, the appliance control device 2 refers to the control table stored in the storage unit 24, and selects at least one combination of the electrical appliance 1 and the energy conservation capability so as to achieve the reduction of 250 W. As an example, the appliance control device 2 sends the control signals including the common control order "100 W" to the electrical appliance $1_1$ and the electrical appliance $1_2$, and also sends the control signal including the common control order "50%" to the electrical appliance $1_n$. As a result, each of the electrical appliances $1_1$ and $1_2$ performs the energy conservation control process such that the current power consumption is lower by 100 W than the power consumption before the receipt of the control signal. Further, the electrical appliance $1_n$ performs the energy conservation control process so as to decrease the power consumption by 50% of the rated power consumption (i.e., 150*0.5=75 W).

According to the appliance control system of the present embodiment as explained in the above, the appliance control device 2 includes the storage unit 24 configured to store all of the energy conservation capabilities of the respective electrical appliances 1. The user need not select the electrical appliance which performs the energy conservation control process and determine the reduction amount of the power consumption of each selected electrical appliance. In brief, the user is only required to input the total reduction amount of the power consumption of all the electrical appliances 1 via the controller 3. When the total reduction amount is inputted, the appliance control device 2 selects one or more electrical appliances 1 in consideration of the energy conservation capabilities of the respective electrical appliances 1 and automatically allocates the appropriate reduction amount to each of the selected one or more electrical appliances 1.

Alternatively, each electrical appliance 1 may store the amount of the power consumption reduced by the performance of the energy conservation control process in its individual storage unit as its energy conservation capability. In this modification, the appliance control device 2 may be configured to retrieve the energy conservation capabilities from the electrical appliances 1. For example, at the time of starting up the appliance control system (at the time of turning on the appliance control device 2), the appliance control device 2 sends a first message for requesting the energy conservation capability to each of the connected electrical appliances 1. Upon receiving the first message, the electrical appliance 1 sends a second message including the energy conservation capability preliminarily stored in the individual storage unit 5 to the appliance control device 2. Upon receiving the second messages, the appliance control device 2 stores the energy conservation capability for each electrical appliance 1 in the storage unit 24, thereby creating the control table.

Figure 6:
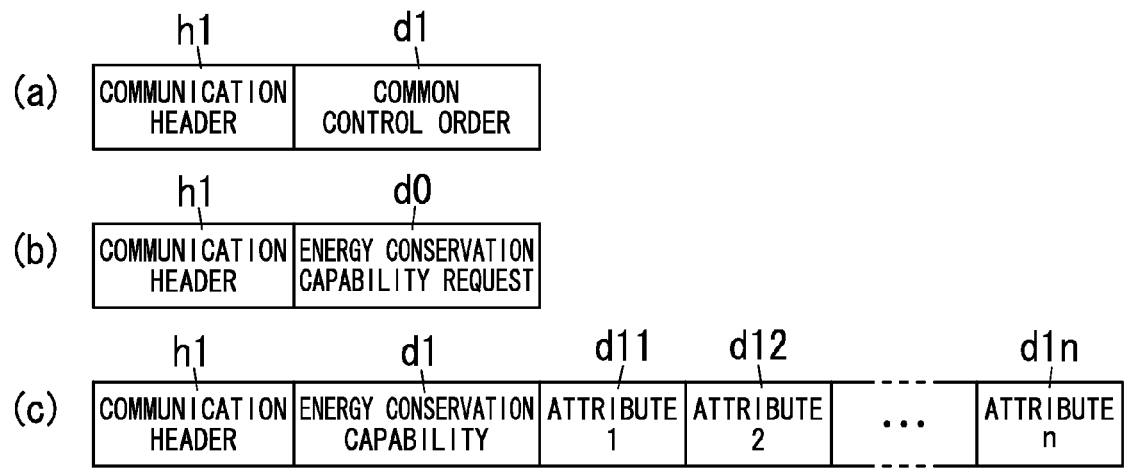
FIG. 6 is an explanation diagram illustrating the signal format used in the third embodiment.

For example, as shown in FIG. 6(*b*), the first message is constituted by a communication header h1 and an energy conservation capability requesting code d0. As shown in FIG. 6(*c*), the second message is constituted by a communication header h1 and data d1, d11 to d1*n* indicative of the energy conservation capabilities. The data d11 to d1*n* respectively indicate the units (attributes) of the energy conservation capability. As mentioned in the above, the appliance control device 2 may be configured to automatically retrieve the energy conservation capability from each electrical appliance 1. According to this configuration, a user need not input the energy conservation capabilities in the storage unit 24.

Figure 7:
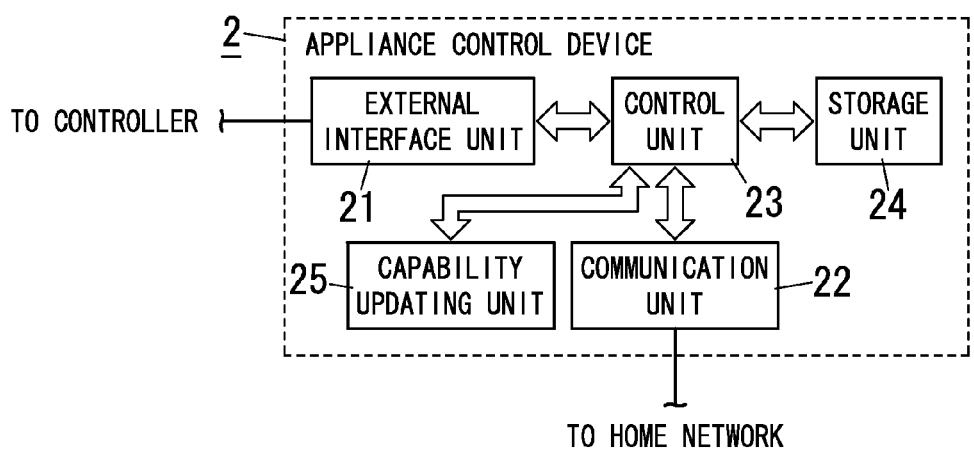
FIG. 7 is a schematic block diagram illustrating the configuration of the appliance control device of the modification of the above third embodiment.

In the modification of the appliance control system of the present embodiment, the capability storage unit (the storage unit 24) is configured to store the energy conservation capabilities associated with the respective operation states of the functional unit 10. As shown in FIG. 7, the appliance control device 2 includes a capability updating unit 25. The capability updating unit 25 is configured to, in response to the performance of the energy conservation control process by the functional unit 10 of the electrical appliance 1, select the energy conservation capability associated with the current operation state of the functional unit 10 as the energy conservation capability to be referenced by the control unit 23.

Thus, as the modification of the present embodiment, the appliance control system may be configured to dynamically modify the control table stored in the storage unit 24 during the operation of the appliance control system. The energy conservation capability is varied with the change in the operation state of the electrical appliance 1. Therefore, the appliance control device 2 includes the capability updating unit 25 configured to, each time the electrical appliance 1 makes a change in its operation state, modify the energy conservation capability to be referenced by the control unit 23 in accordance with the changed operation state (the current operation state). For example, the electrical appliance 1 is configured to, each time the electrical appliance 1 changes its operation state, send the amount of the power consumption reduced by the performance of the energy conservation control process at the changed operation state to the appliance control device 2 as the new energy conservation capability. Each time the appliance control device 2 receives the new energy conservation capability, the appliance control device 2 updates the control table stored in the storage unit 24 by use of the capability updating unit. Besides, in this modification, the item "power consumption" of the control table illustrated in above TABLE 3 indicates the current power consumption after the change of the operation state of the electrical appliance 1.

Thus, in the above modification, the control table is dynamically updated each time the operation state of the electrical appliance 1 is changed. Therefore, the appliance control device 2 can update the energy conservation capabilities of the respective electrical appliances 1 in real time. Hence, the appliance control device 2 can control the electrical appliances 1 to perform the energy conservation control processes based on the energy conservation capabilities corresponding to the current actual operation states of the electrical appliances 1. Besides, it is sufficient the capability updating unit is configured to update the energy conservation capability to be referenced by the control unit 23. In other words, the capability updating unit need not be configured to update the control table. For example, the plural control tables including the energy conservation capabilities may be preliminarily created for the respective operation states. The capability updating unit may be configured to select one from the plural control tables in accordance with the current operation state.

Besides, the configuration explained in the present embodiment can be added to the configuration of the second embodiment. The other configuration and function are same as the first embodiment.

The invention claimed is:

1. An appliance control system comprising:
   plural electrical appliances configured to operate with electrical power supplied from an external power source; and
   an appliance control device connected to said plural electrical appliances,
   wherein said appliance control device comprises an external interface unit, and a control unit, and
   said external interface unit is configured to receive an energy conservation instruction indicative of a total reduction amount of power consumption of said plural electrical appliances from an external device, and
   said control unit is configured to, upon acknowledging that said external interface unit receives the energy conservation instruction, send, to at least one of said plural electrical appliances, a control signal including a common control order indicative of an individual reduction amount of the power consumption of said at least one of said plural electrical appliances based on the total reduction amount indicated by the energy conservation instruction,
   each of said plural electrical appliances comprises:
   a functional unit having plural operation states with different power consumption;
   a control instruction storage unit configured to store plural control instructions for changing the plural operation states of said functional unit;
   an individual storage unit configured to store individual control information indicative of a correspondence relation between the individual reduction amount and the plural control instructions;
   a time period storage unit;
   a time period judging unit; and
   an operation control unit configured to, upon receiving the control signal,
   refer to the individual control information stored in said individual storage unit, and
   select, from the plural control instructions stored in said control instruction storage unit, a control instruction corresponding to the individual reduction amount indicated by the common control order included in the received control signal, and
   provide the selected control instruction to said functional unit, and
   said functional unit is configured to, upon receiving the control instruction from said operation control unit, perform an energy conservation control process of changing its operation state in accordance with the received control instruction,
   wherein the energy conservation instruction further includes an energy conservation time period indicative of a continuous time period of the energy conservation control process, the energy conservation time period included in the control signal, and said time period storage unit is configured to store an allowed continuous time period for which said functional unit is allowed to continue the energy conservation control process corresponding to the common control order, said time period judging unit is configured to, upon receiving the control signal, refer to said time period storage unit, and retrieve the allowed continuous time period associated with the energy conservation control process which is performed by said functional unit in accordance with the energy conservation instruction, and prohibit said functional unit from performing the energy conservation control process upon acknowledging that the allowed continuous time period is equal to or less than the energy conservation time period included in the energy conservation instruction by not providing the control instruction to the functional unit.

2. The appliance control system as set forth in claim 1, wherein each of said plural electrical appliances further comprises a state identifying unit configured to identify a current operation state of said functional unit, and said individual storage unit is configured to store the individual control information for each operation state of said functional unit, and said operation control unit is configured to, upon receiving the control signal, refer to the individual control information stored in said individual storage unit associated with the current operation state identified by said state identifying unit, and select, from the plural control instructions stored in said control instruction storage unit, the control instruction corresponding to the individual reduction amount indicated by the common control order included in the received control signal, and provide the selected control instruction to said functional unit.

3. The appliance control system as set forth in claim 2, wherein each of said plural electrical appliances comprises:

a reduction measurement unit configured to measure a difference in the power consumption of said functional unit between a previous operation state and the current operation state, the previous operation state being defined as an operation state of said functional unit before performance of the energy conservation control process in response to receipt of the control instruction by said functional unit, and the current operation state being defined as an operation state of said functional unit after the performance of the energy conservation control process by said functional unit; and an information creation unit is configured to create the individual control information regarding the previous operation state by associating the control instruction provided to said functional unit with the difference of the power consumption measured by said reduction measurement unit as the individual reduction amount.

4. The appliance control system as set forth in claim 3, wherein said appliance control device further comprises a capability storage unit configured to store, for each of said plural electrical appliances, an energy conservation capability indicative of a decreased amount of power consumption caused by performance of the energy conservation control process by said functional unit, and said control unit is configured to, upon acknowledging that said external interface unit receives the energy conservation instruction, refer to said capability storage unit, and select at least one combination of an electrical appliance of said plural electrical appliances and the energy conservation capability such that the energy conservation capability or a sum of energy conservation capabilities is equal to or more than the total reduction amount indicated by the energy conservation instruction, and send the control signal including the common control order indicative of the individual reduction amount corresponding to the energy conservation capability to the electrical appliance.

5. The appliance control system as set forth in claim 2, wherein said appliance control device further comprises a capability storage unit configured to store, for each of said plural electrical appliances, an energy conservation capability indicative of a decreased amount of power consumption caused by performance of the energy conservation control process by said functional unit, and said control unit is configured to, upon acknowledging that said external interface unit receives the energy conservation instruction, refer to said capability storage unit, and select at least one combination of an electrical appliance of said plural electrical appliances and the energy conservation capability such that the energy conservation capability or a sum of energy conservation capabilities is equal to or more than the total reduction amount indicated by the energy conservation instruction, and send the control signal including the common control order indicative of the individual reduction amount corresponding to the energy conservation capability to the electrical appliance.

6. The appliance control system as set forth in claim 1, wherein said appliance control device further comprises a capability storage unit configured to store, for each of said plural electrical appliances, an energy conservation capability indicative of a decreased amount of power consumption caused by performance of the energy conservation control process by said functional unit, and said control unit is configured to, upon acknowledging that said external interface unit receives the energy conservation instruction, refer to said capability storage unit, and select at least one combination of an electrical appliance of said plural electrical appliances and the energy conservation capability such that the energy conservation capability or a sum of energy conservation capabilities is equal to or more than the total reduction amount indicated by the energy conservation instruction, and send the control signal including the common control order indicative of the individual reduction amount corresponding to the energy conservation capability to the electrical appliance.

7. The appliance control system as set forth in claim 6, wherein said capability storage unit is configured to store the energy conservation capabilities associated with the respective operation states of said functional unit, and said appliance control device further comprises a capability updating unit configured to, in response to the performance of the energy conservation control process by said functional unit of said electrical appliance, select the energy conservation capability associated with a current operation state of said functional unit as the energy conservation capability to be referenced by said control unit.

8. The appliance control system as set forth in claim 7, wherein
said capability storage unit is configured to store appliance priority orders allocated to said respective electrical appliances based on a type of each of said plural electrical appliances, and
said control unit is configured to select said electrical appliance in conformity with the appliance priority orders stored in said capability storage unit in a process of selecting at least one combination of said electrical appliance and the energy conservation capability such that the energy conservation capability or the sum of the energy conservation capabilities is equal to or more than the total reduction amount indicated by the energy conservation instruction.

9. The appliance control system as set forth in claim 7, wherein
said capability storage unit is configured to store the energy conservation capabilities associated with the respective operation states of said functional unit, and energy conservation priority orders allocated to the respective energy conservation capabilities, and
said control unit is configured to select the energy conservation capability in conformity with the energy conservation priority orders stored in said capability storage unit in a process of selecting at least one combination of said electrical appliance and the energy conservation capability such that the energy conservation capability or the sum of the energy conservation capabilities is equal to or more than the total reduction amount indicated by the energy conservation instruction.

10. The appliance control system as set forth in claim 6, wherein
said capability storage unit is configured to store appliance priority orders allocated to said respective electrical appliances based on a type of each of said plural electrical appliances, and
said control unit is configured to select said electrical appliance in conformity with the appliance priority orders stored in said capability storage unit in a process of selecting at least one combination of said electrical appliance and the energy conservation capability such that the energy conservation capability or the sum of the energy conservation capabilities is equal to or more than the total reduction amount indicated by the energy conservation instruction.

11. The appliance control system as set forth in claim 10, wherein
said capability storage unit is configured to store the energy conservation capabilities associated with the respective operation states of said functional unit, and energy conservation priority orders allocated to the respective energy conservation capabilities, and
said control unit is configured to select the energy conservation capability in conformity with the energy conservation priority orders stored in said capability storage unit in the process of selecting at least one combination of said electrical appliance and the energy conservation capability such that the energy conservation capability or the sum of the energy conservation capabilities is equal to or more than the total reduction amount indicated by the energy conservation instruction.

12. The appliance control system as set forth in claim 6, wherein
said capability storage unit is configured to store the energy conservation capabilities associated with the respective operation states of said functional unit, and energy conservation priority orders allocated to the respective energy conservation capabilities, and
said control unit is configured to select the energy conservation capability in conformity with the energy conservation priority orders stored in said capability storage unit in a process of selecting at least one combination of said electrical appliance and the energy conservation capability such that the energy conservation capability or the sum of the energy conservation capabilities is equal to or more than the total reduction amount indicated by the energy conservation instruction.

13. The appliance control system as set forth in claim 1, wherein
said appliance control device further comprises a capability storage unit configured to store, for each of said plural electrical appliances, an energy conservation capability indicative of a decreased amount of power consumption caused by performance of the energy conservation control process by said functional unit, and
said control unit is configured to, upon acknowledging that said external interface unit receives the energy conservation instruction,
refer to said capability storage unit, and
select at least one combination of an electrical appliance of said plural electrical appliances and the energy conservation capability such that the energy conservation capability or a sum of energy conservation capabilities is equal to or more than the total reduction amount indicated by the energy conservation instruction, and
send the control signal including the common control order indicative of the individual reduction amount corresponding to the energy conservation capability to the electrical appliance.

14. An appliance control method comprising the steps of:
an external interface unit of an appliance control device connected to plural electrical appliances receiving an energy conservation instruction indicative of a total reduction amount of power consumption of said plural electrical appliances from an external device,
a control unit of said appliance control device, upon acknowledging that said external interface unit receives the energy conservation instruction, sending, to at least one of said plural electrical appliances, a control signal including a common control order indicative of an individual reduction amount of the power consumption of said at least one of said plural electrical appliances based on the total reduction amount indicated by the energy conservation instruction, and
each of said plural electrical appliances:
referring to an individual control information, which is stored in an individual storage unit, of a correspondence relation between the individual reduction amount and plural control instructions;
selecting, from the plural control instructions stored in a control instruction storage unit, a control instruction corresponding to the individual reduction amount indicated by the common control order included in the received control signal; and
upon receiving the control instruction from an operation control unit, performing an energy conservation control process of changing its operation state in accordance with the selected control instruction, wherein each of said plural electrical appliances comprises:

a time period storage unit; and a time period judging unit, the energy conservation instruction further includes an energy conservation time period indicative of a continuous time period of the energy conservation control process, the energy conservation time period included in the control signal, and said time period storage unit is configured to store an allowed continuous time period for which said functional unit is allowed to continue the energy conservation control process corresponding to the common control order, said time period judging unit is configured to, upon receiving the control signal, refer to said time period storage unit, and retrieve the allowed continuous time period associated with the energy conservation control process which is performed by said functional unit in accordance with the energy conservation instruction, and prohibit said functional unit from performing the energy conservation control process upon acknowledging that the allowed continuous time period is equal to or less than the energy conservation time period included in the energy conservation instruction by not providing the control instruction to the functional unit.

* * * * *